Feb. 3, 1948.                D. H. GRAHAM                2,435,440
                          REVERSIBLE MOTOR DRIVE
                           Filed Sept. 6, 1946
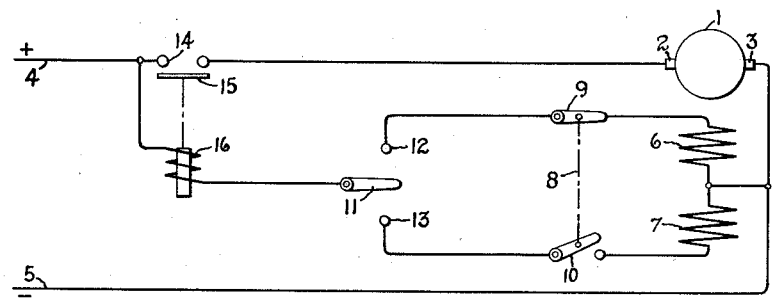
Inventor:
Douglas H. Graham,
by Pownell S. Mack
His Attorney.

Patented Feb. 3, 1948

2,435,440

UNITED STATES PATENT OFFICE 2,435,440

REVERSIBLE MOTOR DRIVE

Douglas H. Graham, Coventry, England, assignor to General Electric Company, a corporation of New York Application September 6, 1946, Serial No. 695,327
In Great Britain August 14, 1944

Section 1, Public Law 690, August 8, 1946
Patent expires August 14, 1964

9 Claims. (Cl. 318—267)

My invention relates to reversible motor drives and particularly to such a drive utilizing a shunt field motor.

Electric motor drives of the reversible type have been used for operating doors, wing flaps, and under carriages on airplanes, and have generally been of the split series field type, as this affords a simple control arrangement. In many cases, it has been found desirable to employ split shunt field motors because of the wide difference in the load in the two directions of rotation or because of the wide variation in the torque requirements for opposite directions of rotation in such applications. In order to assure against the energization of the motor armature when the shunt field is deenergized, the control of shunt motors of this type has generally been relatively complicated as compared to that for series motors.

An object of my invention is to provide an improved and simplified reversible motor drive.

Further objects and advantages of my invention will become apparent and my invention will be better understood from the following description referring to the accompanying drawing, and the features of novelty which characterize my invention will be pointed out with particularity in the claims annexed to and forming part of this specification.

The drawing is a schematic illustration of a reversible motor drive provided with an embodiment of my invention.

Referring to the drawing, I have shown a reversible motor drive in which an electric motor is adapted to drive any desired driven load which may be operated in opposite directions. This electric motor is shown as being provided with an armature 1 of any conventional type, to which energization is provided through brushes 2 and 3 which are adapted to be connected to a source of electric power supply through conductors 4 and 5. Excitation is supplied to the motor by a split two-part shunt field exciting winding including winding parts 6 and 7 which, when energized, are adapted to excite the motor in opposite directions to provide for opposite directions of rotation of the armature 1. Energization of one or the other of the two parts of the shunt field exciting winding is provided in accordance with the conditions of the driven load. Thus, when the driven load reaches a predetermined position which may be the limit of its travel, the energization of the part of the shunt field exciting winding which excited the motor for driving the load to its predetermined position is removed, and in most instances, it will be found desirable to close the circuit for the energization of the other part of the field exciting winding at the time that the circuit is opened for the first-mentioned part of the field exciting winding, thus providing a circuit for the opposite rotation of the motor when it is desired to supply energization to this second part of the field exciting winding. This selective opening and closing of the circuit of each part of the field exciting winding in response to different predetermined conditions of the driven load may be provided by any suitable means, as by a two-pole switch 8 having contacts 9 and 10 connected in the circuit of the two parts 6 and 7, respectively, of the shunt field exciting winding. In order to control the energization of the field exciting winding parts through the two-pole switch 8, a suitable circuit breaker is provided which is adapted to energize either one or the other of the field exciting winding part circuits, and, as shown, a suitable double throw switch 11 may be provided connected in circuit with one of the supply lines from the source of electrical power and adapted to be closed on a pair of contacts 12 or 13 for selectively energizing either one of the field circuits.

With a shunt type motor, it is necessary to provide a definite circuit interrupting arrangement which will assure against the energization of the motor armature whenever the field circuit is opened in order to prevent overspeeding of the motor. In the illustrated arrangement, this is obtained by providing a circuit breaker having contacts 14 which are adapted to be closed through a contactor 15 operated by an operating coil 16 connected in series with the field exciting winding selective energizing double throw switch 11 for opening and closing the motor armature circuit through the circuit breaker contactor 15 in response respectively to the deenergization of the field exciting winding and to the energization of either part thereof. With this arrangement, whenever the field circuit selecting switch 11 is opened such that the field exciting winding is deenergized, the circuit breaker operating coil 16 also is deenergized, thus opening the armature circuit. Furthermore, if the selector switch 11 is closed on either of its contacts 12 or 13 and the driven load reaches its predetermined condition and operates the double pole switch 8 such that it opens the circuit of the part of the field exciting winding 6 or 7 which provided excitation to the motor, the pole contact of the switch 8 which originally closed the circuit of a part of the field exciting winding is moved to its open circuit position and the other pole contact to its closed circuit position, thereby removing excitation from the motor. The circuit of the operating coil 16 of the circuit breaker thus again is broken and the armature circuit is opened by the circuit breaker contactor 15, thereby assuring the opening of the armature circuit when the field excitation is removed from the motor, and thus preventing undesirable overspeeding.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A reversible drive for a driven load including an electric motor having an armature and a split two-part shunt field exciting winding for exciting said motor in opposite directions, means for selectively energizing said field exciting winding parts in response to different predetermined conditions of the driven load, means for controlling the energizing of said motor armature, and means for opening and closing the motor armature circuit through said armature energizing control means in response respectively to deenergization of said field exciting winding and energization of either part thereof.

2. A reversible drive for a driven load including an electric motor having an armature and a split two-part shunt field exciting winding for exciting said motor in opposite directions, means for selectively opening and closing the circuit of each part of said field exciting winding in response to different predetermined conditions of the driven load, means including a double throw switch for selectively controlling the energizing of said field exciting winding parts through said selective circuit closing means, means for controlling the energizing of said motor armature, and means for opening and closing the motor armature circuit through said armature energizing control means in response respectively to deenergization of said field exciting winding and energization of either part thereof.

3. A reversible drive for a driven load including an electric motor having an armature and a split two-part shunt field exciting winding for exciting said motor in opposite directions, means for selectively opening and closing the circuit of each part of said field exciting winding in response to different predetermined conditions of the driven load, means for selectively controlling the energizing of said field exciting winding parts through said selective circuit closing means, means for controlling the energizing of said motor armature, and means for opening and closing the motor armature circuit through said armature energizing control means in response respectively to deenergization of said field exciting winding and energization of either part thereof.

4. A reversible drive for a driven load including an electric motor having an armature and a split two-part shunt field exciting winding for exciting said motor in opposite directions, means including a two-pole switch for selectively opening and closing the circuit of each part of said field exciting winding in response to different predetermined conditions of the driven load, means for selectively controlling the energizing of said field exciting winding parts through said two-pole switch, means for controlling the energizing of said motor armature, and means for opening and closing the motor armature circuit through said armature energizing control means in response respectively to deenergization of said field exciting winding and energization of either part thereof.

5. A reversible drive for a driven load including an electric motor having an armature and a split two-part shunt field exciting winding for exciting said motor in opposite directions, means for selectively opening and closing the circuit of each part of said field exciting winding in response to different predetermined conditions of the driven load, means for selectively controlling the energizing of said field exciting winding parts through said selective circuit closing means, means including a circuit breaker for controlling the energizing of said motor armature, and means for opening and closing the motor armature circuit through said circuit breaker in response respectively to deenergization of said field exciting winding and energization of either part thereof.

6. A reversible drive for a driven load including an electric motor having an armature and a split two-part shunt field exciting winding for exciting said motor in opposite directions, means including a two-pole switch for selectively opening and closing the circuit of each part of said field exciting winding in response to different predetermined conditions of the driven load, means for selectively controlling the energizing of said field exciting winding parts through said two-pole switch, means including a circuit breaker for controlling the energizing of said motor armature, and means for opening and closing the motor armature circuit through said circuit breaker in response respectively to deenergization of said field exciting winding and energization of either part thereof.

7. A reversible drive for a driven load including an electric motor having an armature and a split two-part shunt field exciting winding for exciting said motor in opposite directions, means including a two-pole switch for selectively opening and closing the circuit of each part of said field exciting winding in response to different predetermined conditions of the driven load, means including a double throw switch for selectively controlling the energizing of said field exciting winding parts through said two-pole switch, means including a circuit breaker for controlling the energizing of said motor armature, and means for opening and closing the motor armature circuit through said circuit breaker in response respectively to deenergization of said field exciting winding and energization of either part thereof.

8. A reversible drive for a driven load including an electric motor having an armature and a split two-part shunt field exciting winding for exciting said motor in opposite directions, means for selectively opening and closing the circuit of each part of said field exciting winding in response to different predetermined conditions of the driven load, means for selectively controlling the energizing of said field exciting winding parts through said selective circuit closing means, means including a circuit breaker for controlling the energizing of said motor armature, and means including an operating coil for said circuit breaker in series with said field exciting winding selective energizing means for opening and closing the motor armature circuit through said circuit breaker in response respectively to deenergization of said field exciting winding and energization of either part thereof.

9. A reversible drive for a driven load including an electric motor having an armature and a split two-part shunt field exciting winding for exciting said motor in opposite directions, means including a two-pole switch for selectively opening and closing the circuit of each part of said field exciting winding in response to different predetermined conditions of the driven load, means including a double throw switch for selectively controlling the energizing of said field exciting winding parts through said two-pole switch, means including a circuit breaker for controlling the energizing of said motor armature, and means including an operating coil for said circuit breaker in series with said field exciting winding selective energizing control means for opening and closing the motor armature circuit through said circuit breaker in response respectively to deenergization of said field exciting winding and energization of either part thereof.

DOUGLAS H. GRAHAM.